US010801314B2

(12) United States Patent
Samuel et al.

(10) Patent No.: US 10,801,314 B2
(45) Date of Patent: Oct. 13, 2020

(54) REAL-TIME TRAJECTORY CONTROL DURING DRILLING OPERATIONS

(71) Applicant: Landmark Graphics Corporation, Houston, TX (US)

(72) Inventors: Robello Samuel, Cypress, TX (US); Zhengchun Liu, Sugar Land, TX (US); Jeffrey Marc Yarus, Houston, TX (US); Jin Fei, Houston, TX (US)

(73) Assignee: LANDMARK GRAPHICS CORPORATION, Houston, TX (US)

( * ) Notice: Subject to any disclaimer, the term of this patent is extended or adjusted under 35 U.S.C. 154(b) by 388 days.

(21) Appl. No.: 15/565,411

(22) PCT Filed: Dec. 20, 2016

(86) PCT No.: PCT/US2016/067735

§ 371 (c)(1),
(2) Date: Oct. 9, 2017

(87) PCT Pub. No.: WO2018/118020

PCT Pub. Date: Jun. 28, 2018

(65) Prior Publication Data

US 2018/0340408 A1 Nov. 29, 2018

(51) Int. Cl.
*E21B 44/02* (2006.01)
*E21B 47/022* (2012.01)
(Continued)

(52) U.S. Cl.
CPC .............. *E21B 44/02* (2013.01); *E21B 7/046* (2013.01); *E21B 47/022* (2013.01); *G06F 19/00* (2013.01)

(58) Field of Classification Search
None
See application file for complete search history.

(56) References Cited

U.S. PATENT DOCUMENTS 9,062,528 B2 * 6/2015 Mitchell ............... E21B 47/022
2004/0015483 A1 1/2004 Hogan
2010/0282508 A1 * 11/2010 Johnston .................. E21B 7/04 175/24
2014/0151121 A1 * 6/2014 Boone ..................... E21B 44/02 175/27
(Continued)

FOREIGN PATENT DOCUMENTS

GB 2367626 A 4/2002
WO WO-2009064728 A1 * 5/2009
(Continued)

OTHER PUBLICATIONS

Chen et al. "Optimization of Well Trajectory Under Uncertainty for PRoactive Geosteering", Apr. 2015 SPE Journal, pp. 368-383. (Year: 2015).*

(Continued)

*Primary Examiner* — Suzanne Lo

(57) ABSTRACT

A method may include drilling a deviated wellbore penetrating a subterranean formation according to bottom hole assembly parameters and surface parameters; collecting real-time formation data during drilling; updating a model of the subterranean formation based on the real-time formation data and deriving formation properties therefrom; collecting survey data corresponding to a location of a drill bit in the subterranean formation; deriving a target well path for the drilling based on the model of the subterranean formation; deriving a series of trajectory well paths based on the formation properties, the survey data, the bottom hole assembly parameters, and the surface parameters and uncertainties associated therewith; deriving an actual well path based on the series of trajectory well paths; deriving a deviation between the target well path and the actual well path; and adjusting the bottom hole assembly parameters and the surface parameters to maintain the deviation below a threshold.

20 Claims, 10 Drawing Sheets

(51) Int. Cl.
*E21B 7/04* (2006.01)
*G06F 19/00* (2018.01)

(56) References Cited

U.S. PATENT DOCUMENTS

| | | | | |
|---|---|---|---|---|
| 2016/0145991 | A1* | 5/2016 | Yarus | E21B 44/00 700/275 |
| 2016/0281489 | A1* | 9/2016 | Dykstra | G01V 99/005 |

FOREIGN PATENT DOCUMENTS

| | | | |
|---|---|---|---|
| WO | 20150112160 | A1 | 7/2015 |
| WO | 2015119875 | A1 | 8/2015 |
| WO | 2016024945 | A1 | 2/2016 |
| WO | 2016108897 | A1 | 7/2016 |

OTHER PUBLICATIONS

Weston et al. "New Gyro While Drilling Technology Delivers Accurate Azimuth and Real-Time Quality Control for All Well Trajectories", Sep. 2014 SPE Drilling & Completion, pp. 295-303. (Year: 2014).*

J.M. Yarus and M. Srivastava, Uncertainty updating in real-time drilling: a probabilistic approach to model updating while drilling, 2nd EAGE Integrated Reservoir Modeling Conference Dubai, Nov. 19, 2014.

Y. Zhang and R. Samuel (Sep. 28, 2015). Analytical Model to Estimate the Directional Tendency of Point and Push-the-Bit BHAs. Society of Petroleum Engineers. doi:10.2118/174798-MS.

Z. Liu, R. Samuel, C. Marland, and J. Li, (May 21, 2014). An Analytical Model Coupled With Data Analytics to Estimate PDC Bit Wear. Society of Petroleum Engineers. doi:10.2118/169451-MS.

J. He, Y. Chen, Z, Liu, R. Samuel, Global Correlation of Rock Brittleness Indices with Petrophysical and Geomechanical Properties and Its Application to the Prediction of Rate of Penetration (ROP), paper SPE 180518 to be presented at SPE Asia Pacific Drilling Technology Conference and Exhibition (IADC), 2016.

Z. Liu, R. Samuel, Wellbore-Trajectory Control by Use of Minimum Well-Profile-Energy Criterion for Drilling Automation, Apr. 2016 SPE Journal, SPE170861.

International Search Report and Written Opinion for PCT/US2016/067735 dated Sep. 7, 2017.

* cited by examiner

REAL-TIME TRAJECTORY CONTROL DURING DRILLING OPERATIONS

BACKGROUND

The present application relates to controlling the trajectory of a drill bit during a drilling operation.

In directional drilling operations, a variety of data obtained before drilling is processed to model a projected wellbore path for the directional drilling operation to maximize the wellbore's intersection with "sweet spots" (hydrocarbon-rich zone with a high potential for productivity) while maintaining acceptable levels of dogleg severity and tortuosity along the wellbore path. However, during directional drilling variations in the formation properties not seen in the original data and variations in the drilling parameters may cause the actual wellbore path to deviate from the projected wellbore path.

BRIEF DESCRIPTION OF THE DRAWINGS

The following figures are included to illustrate certain aspects of the embodiments, and should not be viewed as exclusive embodiments. The subject matter disclosed is capable of considerable modifications, alterations, combinations, and equivalents in form and function, as will occur to those skilled in the art and having the benefit of this disclosure.

DETAILED DESCRIPTION

The present application relates to controlling the trajectory of a drill bit during a drilling operation by accounting for uncertainties in the directional drilling system and the subterranean formation.

When attempting to drill a projected wellbore path, the variations in downhole conditions relative to the original model (e.g., a variation in the formation properties) and improper execution of the directional drilling system (e.g., the weight on bit or hydraulic pressure that steers the drill bit actually being a few percent less than instructed) are uncertainties that may cause the actual wellbore path to depart from the projected wellbore path. The analyses, methods, and systems described herein use real-time data associated with downhole conditions to mitigate an actual wellbore path from departing from the projected wellbore path due to uncertainties.

Figure 1:
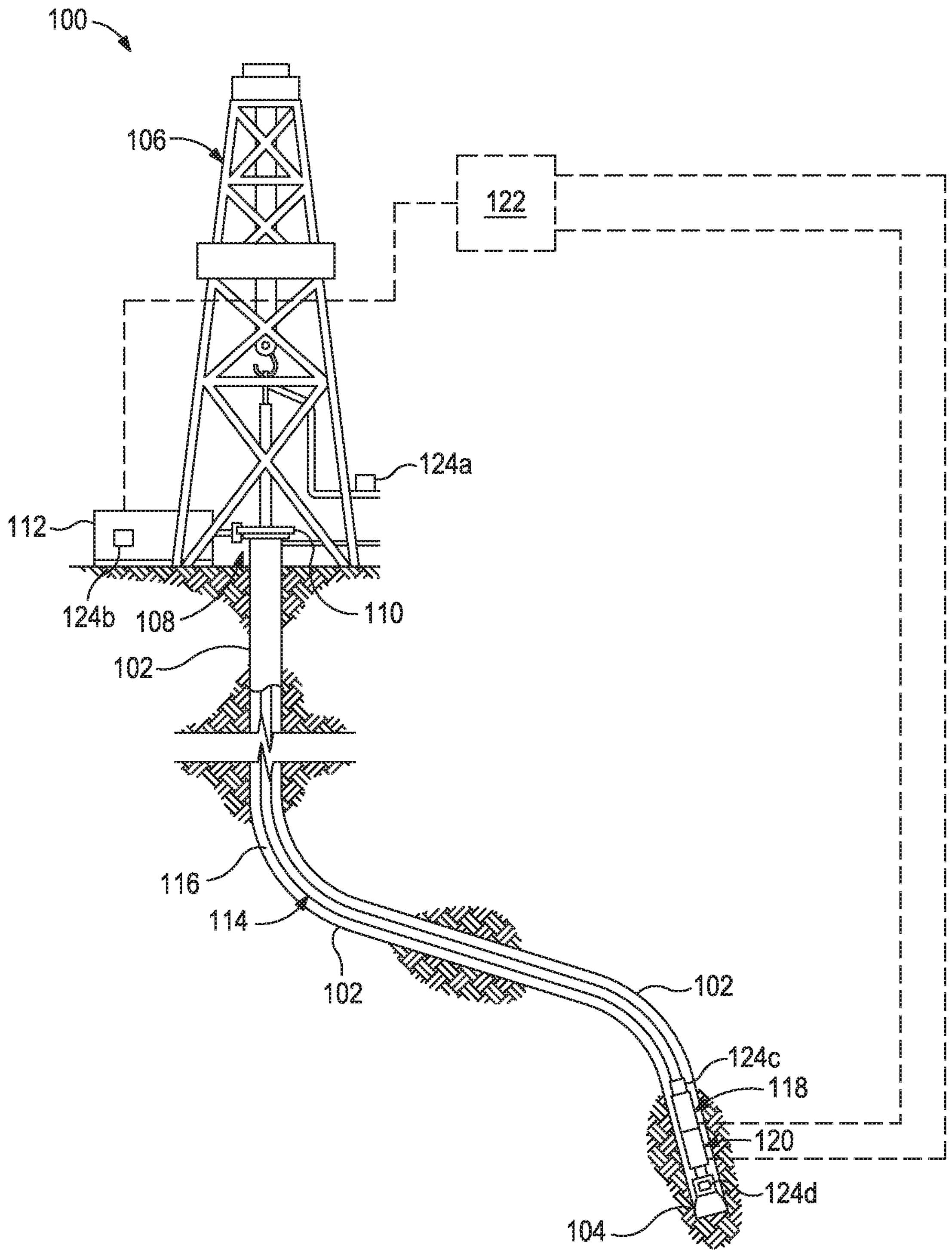
FIG. 1 is an illustration of an example directional drilling system for drilling a wellbore.

FIG. 1 is an illustration of an example directional drilling system 100 for drilling a wellbore 102, in accordance with some embodiments of the present disclosure. The wellbore 102 may include a wide variety of profiles or trajectories such that the wellbore 102 may be referred to as a "directional wellbore" or "deviated wellbore" having multiple sections or segments that extend at a desired angle or angles relative to vertical. A directional wellbore may be formed by applying hydraulic pressure to one or more drill bit steering components in the bottom hole assembly (BHA) 120 in order to steer the associated drill bit 104 forming the wellbore 102. The amount of hydraulic pressure may dictate the degree of change in the direction of the drill bit 104 such that the hydraulic pressure may indicate the trajectory of a directional wellbore 102.

The directional drilling system 100 may include drilling platform 106. However, teachings of the present disclosure may be applied to wellbores using drilling systems associated with offshore platforms, semi-submersible, drill ships and any other drilling system satisfactory for forming a wellbore extending through one or more downhole formations.

The drilling platform 106 may be coupled to a wellhead 108. Drilling platform 106 may also include rotary table 110, rotary drive motor 112, and other equipment associated with rotation of drill string 114 within wellbore 102. An annulus 116 may be formed between the exterior of drill string 114 and the inside diameter of wellbore 102.

The directional drilling system 100 may include various downhole drilling tools and components associated with a measurement-while-drilling (MWD) and/or logging-while-drilling (LWD) system 118 that provides logging data and other information from the bottom of wellbore 102 to a control system 122. The control system 122 may also be communicably coupled to the BHA 120 and the rotary drive motor 112.

The control system 122 may be a singular computer with one or more processors for performing the analyses and methods described herein. Alternatively, the control system 122 may comprise more than one processor with processors associated with the different components of the directional drilling system 100 that collectively perform the analyses and methods described herein.

The directional drilling system 100 may include a plurality of sensors 124 in addition to the MWD/LWD system 118 for measuring parameters and data associated with a drilling operation (e.g., survey data, real-time formation data, BHA parameters, and surface parameters, each described further herein). For example, sensor 124*a* may be coupled to a flow pipe or pump to measure the flow rate of the drilling fluid. In another example, sensor 124*b* may be coupled to the rotary drive motor 112 or other suitable component of the directional drilling system 100 to measure the revolutions per minute (rpm) of the drill string. In yet another example, sensors 124*c*,124*d* may be located at or near the drill bit 104 to ascertain the location of the drill bit 104 in the subterranean formation.

Figure 2:
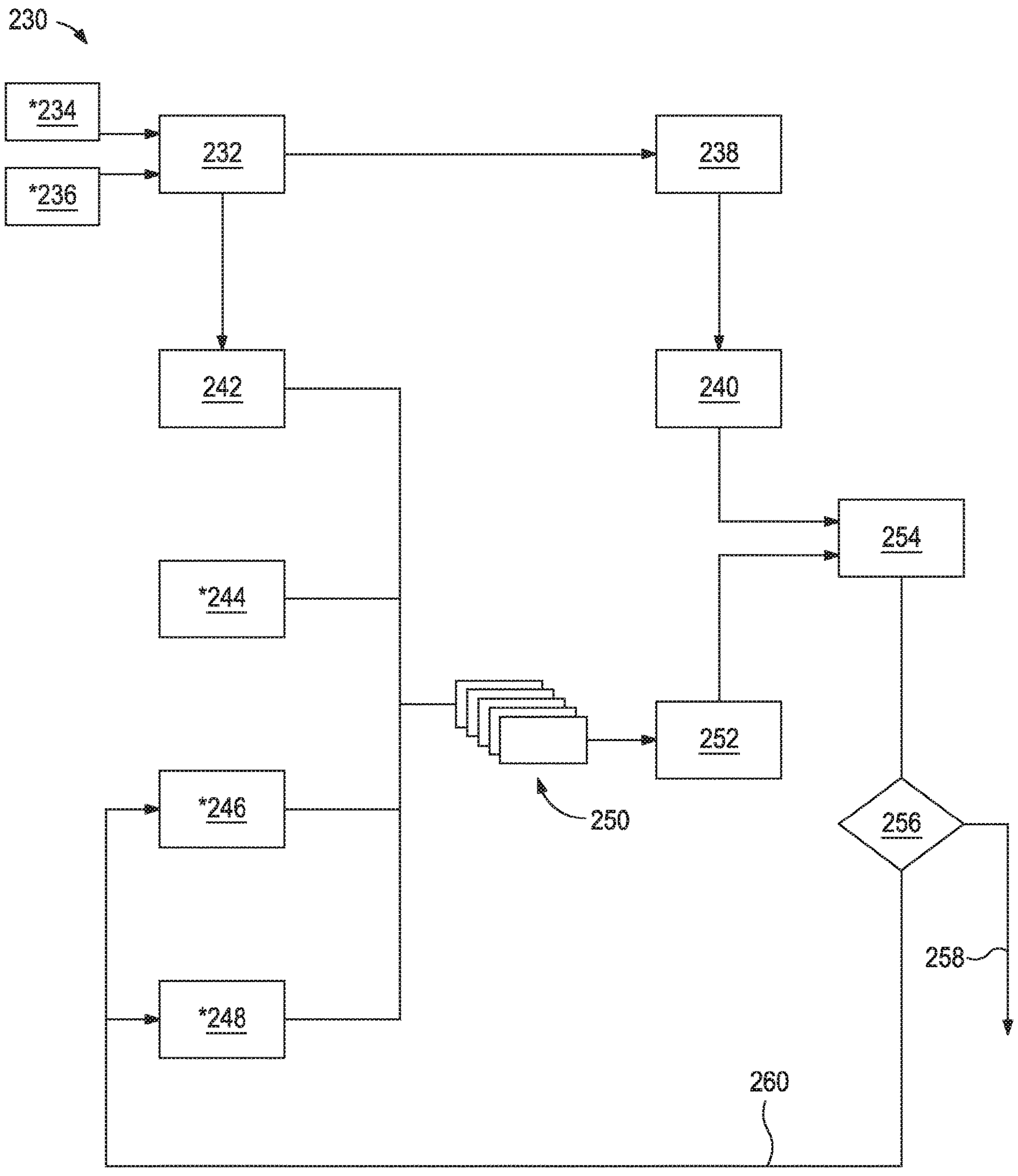
FIG. 2 illustrates a workflow of an exemplary analysis method.

FIG. 2 illustrates a workflow of an exemplary analysis method 230, in accordance with some embodiments of the present disclosure. The analysis method 230 includes several inputs, each designated by an asterisk in FIG. 2.

The analysis method 230 uses a formation model 232, which originally was produced from original data 234 collected before drilling (e.g., seismic data, offset well data, and formation data collected from other wells in the field) and is updated as the wellbore is drilled using real-time formation data 236 (e.g., data collected during drilling with the MWD/LWD tools). In some instances, an earth model may be used to produce and update the formation model 232 from the described inputs.

The original data 234 and real-time formation data 236 may be formation properties. As used herein, the term "formation properties," and grammatical variants thereof, refers to a property of the rocks in the formation or a fluid therein that include, but are not limited to, mineralogy, Young's modulus, brittleness, porosity, permeability, relative permeability, total organic content, water content, Poisson's ratio, pore pressure, and the like, and any combination thereof.

The formation model 232 is a mathematical representation of the subterranean formation that correlates the formation properties to a location within the formation. The mathematical representation may be a 3-dimensional grid matrix of the subterranean formation (also known as a geocellular grid), a 2-dimensional slice or topographical collapse of the 3-dimensional grid matrix, a 1-dimensional array representing the subterranean formation, and the like. In a 1-dimensional array, the data points that relate the formation property to a location (e.g., the individual data points in the geocellular grid) are converted to a mathematical matrix having matrix identification values corresponding to each of the data points in the geocellular grid.

The formation model 232 may identify locations within the formation with high total organic content and high porosity (sweet spots), with mineralogy difficult to drill, with high water content, and the like, and any combination thereof. Based on the formation model 232, an ideal well path 238 is derived to preferably maximize intersection with the sweet spots in the formation and minimize intersection with water and mineralogy difficult to drill. Then, the ideal well path 238 is adjusted to account for drillability factors, like dogleg severity and tortuosity, to produce a target well path 240. As used herein, the term "drillability factors," and grammatical variants thereof, refers to physical and mechanical limitations to directional drilling through a formation. Alternatively, the target well path 240 may be derived based on the formation model 232 to preferably maximize intersection with the sweet spots in the formation and minimize intersection with water and mineralogy difficult to drill while accounting for drillability factors like dogleg severity and tortuosity.

Referring again to the formation model 232, using the real-time formation data 236 collected during drilling with the MWD/LWD tools, the formation model 232 produces updated formation properties 242. For example, gamma ray measurements and/or nuclear magnetic resonance measurements from a MWD/LWD tool located along the drill string of a subterranean formation may be used by the formation model 232 to calculate the porosity of the surrounding formation.

Further, as an input for the analysis method 230, sensors at or near the drill bit (e.g., up to about 50 feet behind the drill bit along the drilling string) may be used to track the actual wellbore path by providing a specific location of the sensors and/or the drill bit (referred to herein as survey data 244). Generally, the sensors provide measurements of the sensor location, but in some instances, a mathematical model (not illustrated) may include additional computations to estimate the drill bit location relative to the sensors. As used herein, the term "survey data," and grammatical variants thereof, refers to the data that describes the location of the sensors and/or the drill bit in the subterranean formation. The survey data 244 may include, but are not limited to, inclination, azimuth, measured depth (distance along the actual well path from the wellhead, which is typically calculated or otherwise derived from survey data), and the like, and any combination thereof.

Another input for the analysis method 230 is BHA parameters 246. As used herein, the term "BHA parameters," and grammatical variants thereof, are the data that describes the direction the drill bit is pointing relative to a central longitudinal axis of the drill string closest to the drill bit. Exemplary BHA parameters 246 may include, but are not limited to, tool face angle, tilt angle, steering pad displacement, and the like, and any combination thereof.

Finally, surface parameters 248 are included as a method input. As used herein, the term "surface parameters," and grammatical variants thereof, are the data that describes the conditions of the drilling operation that can be measured or controlled at the surface. Exemplary surface parameters 248 may include, but are not limited to, revolutions per minute of the drill string (and consequently the drill bit), weight on bit, drilling fluid flow rate, drilling fluid weight, and the like, and any combination thereof.

Each of the BHA parameters 246 and surface parameters 248 may be the values an operator or the control system inputs or may be the actual values detected by an appropriately placed sensor.

The updated formation properties 242, the survey data 244, the BHA parameters 246, and the surface parameters 248 are used to model a series of trajectory well paths 250 for the drill bit. Each of the trajectory well paths 250 may be characterized as a series of Cartesian coordinates $(X_i, Y_i, Z_i)$, where i=1, 2, 3, . . . , k, k+1, k+2, . . . and k represents the current timestamp. The Cartesian coordinates $(X_i, Y_i, Z_i)$ can be calculated from the measured depth of the survey data 244 (e.g., inclination (in), azimuth (az), and measured depth (md)). Therefore, in some instances, the trajectory well paths 250 may alternatively be characterized by corresponding coordinates $(in_i, az_i, md_i)$.

Generally, the real-time formation data 236 collected during drilling with the MWD/LWD tools and the survey data 244 lag because (1) the MWD/LWD tools are usually located several to tens of feet behind the drill bit and (2) accurate gyroscope data for the survey data 244 requires stationary measurement so the gyroscope data may be taken after drill bit advances the distance of pipe stand (typically 30 or 90 feet). Therefore, trajectory well paths 250 provide a probabilistic analysis of the current drill bit position and the future drill bit position.

Figure 3:
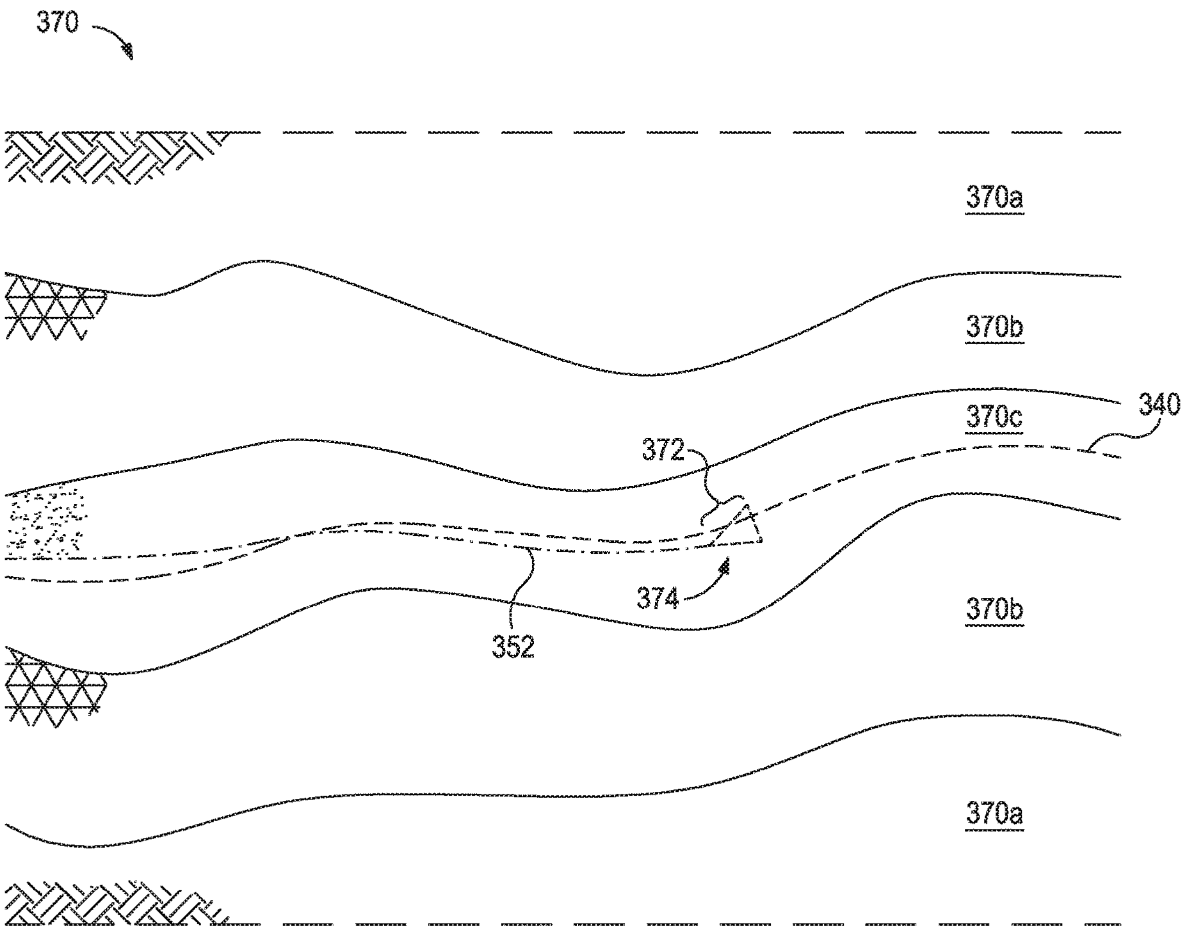
FIG. 3 illustrates a representation of a subterranean formation with several mineralogies with the target well path and actual well path represented.

For example, FIG. 3 illustrates a representation of a subterranean formation 370 with several mineralogies 370*a*, 370*b*, 370*c* where the sweet spot 370*c* is at the central mineralogy. The target well path 340 and actual well path 352 are illustrated as passing through the sweet spot. The window of uncertainty 372 is produced when combining the trajectory well paths using the probabilistic methodology.

The actual drill bit location 374 is within the window of uncertainty 372 because of the lag discussed above.

Referring again to FIG. 2, each of the updated formation properties 242, the survey data 244, the BHA parameters 246, and the surface parameters 248 also have uncertainties related thereto arising from components being slightly off calibration, general measurement/experimental error, response time of components (e.g., BHA components) to instructions received, the location of sensors and MWD/LWD tools relative to the drill bit, and the like, and any combination thereof. The analysis method 230 accounts for these uncertainties by modeling a series of trajectory well paths 250.

The trajectory well paths 250 are combined using a probabilistic methodology to produce the actual well path 252 that may extend to the drill bit location 374 of FIG. 3 or beyond depending on the operator's preferences.

Referring again to FIG. 2, using the target well path 240 and actual well path 252, a deviation 254 between the target well path 240 and the actual well path 252 is determined. The deviation 254 may be expressed as a normal distribution $N(\mu_{\Delta p}, \sigma_{\Delta p})$, where $\Delta p$ is the length of deviation vector, $\mu_{\Delta p}$ is the mean value of the normal distribution, and $\sigma_{\Delta p}$ is the standard deviation of the normal distribution].

Then, a threshold 256 for the deviation 254 (e.g., about 1 feet or less at the drill bit location or about 2 feet or less at 5 feet beyond the drill bit location) is applied. If the deviation 254 is within the threshold 256, the drilling continues 258 under the present conditions (e.g., with the present BHA parameters 246 and the present surface parameters 248). Alternatively, if the deviation 254 is beyond the threshold 256, adjustments 260 may be made in the BHA parameters 246 and the surface parameters 248 to bring the deviation 254 within the threshold 256.

The foregoing methods and analyses may be performed, at least in part, using a control system (e.g., control system 122 of FIG. 1). The processor and corresponding computer hardware used to implement the various illustrative blocks, modules, elements, components, methods, and algorithms described herein may be configured to execute one or more sequences of instructions, programming stances, or code stored on a non-transitory, computer-readable medium (e.g., a non-transitory, tangible, computer-readable storage medium containing program instructions that cause a computer system running the program of instructions to perform method steps or cause other components/tools to perform method steps described herein). The processor can be, for example, a general purpose microprocessor, a microcontroller, a digital signal processor, an application specific integrated circuit, a field programmable gate array, a programmable logic device, a controller, a state machine, a gated logic, discrete hardware components, an artificial neural network, or any like suitable entity that can perform calculations or other manipulations of data. In some embodiments, computer hardware can further include elements such as, for example, a memory (e.g., random access memory (RAM), flash memory, read only memory (ROM), programmable read only memory (PROM), erasable programmable read only memory (EPROM)), registers, hard disks, removable disks, CD-ROMS, DVDs, or any other like suitable storage device or medium.

Executable sequences described herein can be implemented with one or more sequences of code contained in a memory. In some embodiments, such code can be read into the memory from another machine-readable medium. Execution of the sequences of instructions contained in the memory can cause a processor to perform the methods and analyses described herein. One or more processors in a multi-processing arrangement can also be employed to execute instruction sequences in the memory. In addition, hard-wired circuitry can be used in place of or in combination with software instructions to implement various embodiments described herein. Thus, the present embodiments are not limited to any specific combination of hardware and/or software.

As used herein, a machine-readable medium will refer to any medium that directly or indirectly provides instructions to a processor for execution. A machine-readable medium can take on many forms including, for example, non-volatile media, volatile media, and transmission media. Non-volatile media can include, for example, optical and magnetic disks. Volatile media can include, for example, dynamic memory. Transmission media can include, for example, coaxial cables, wire, fiber optics, and wires that form a bus. Common forms of machine-readable media can include, for example, floppy disks, flexible disks, hard disks, magnetic tapes, other like magnetic media, CD-ROMs, DVDs, other like optical media, punch cards, paper tapes and like physical media with patterned holes, RAM, ROM, PROM, EPROM, and flash EPROM.

Embodiments described herein include, but are not limited to, Embodiment A, Embodiment B, and Embodiment C.

Embodiment A is a method comprising: drilling a deviated wellbore penetrating a subterranean formation according to bottom hole assembly parameters and surface parameters; collecting real-time formation data during drilling; updating a model of the subterranean formation based on the real-time formation data and deriving formation properties therefrom; collecting survey data corresponding to a location of a drill bit in the subterranean formation; deriving a target well path for the drilling based on the model of the subterranean formation; deriving a series of trajectory well paths based on the formation properties, the survey data, the bottom hole assembly parameters, and the surface parameters and uncertainties associated therewith; deriving an actual well path based on the series of trajectory well paths; deriving a deviation between the target well path and the actual well path; and adjusting the bottom hole assembly parameters and the surface parameters to maintain the deviation below a threshold.

Embodiment B is a system comprising: a drill string extending into a deviated wellbore penetrating a subterranean formation and having a bottom hole assembly and a drill bit at a distal end of the drill string; a plurality of sensors in various locations of the system to detect real-time formation data, survey data corresponding to a location of the drill bit in the subterranean formation, bottom hole assembly parameters, and surface parameters; a non-transitory computer-readable medium communicably coupled to the plurality of sensor and the bottom hole assembly and encoded with instructions that, when executed, cause the system to perform a method according to Embodiment A.

Embodiment C is a non-transitory computer-readable medium encoded with instructions that, when executed, cause a system to perform a method according to Embodiment A.

Embodiments A, B, and C may optionally include one or more of the following: Element 1: wherein the threshold is 10 feet or less at the drill bit; Element 2: wherein deriving a target well path for the drilling based on the model of the subterranean formation comprises: deriving an ideal well path for the drilling based on the model of the subterranean formation that maximizes intersection between the ideal well path and sweet spots in the subterranean formation; and adjusting the ideal well path to account for drillability factors, thereby producing the target well path; Element 3: wherein the bottom hole assembly parameters comprise at least one selected from the group consisting of: tool face angle, tilt angle, steering pad displacement, and any combination thereof; Element 4: wherein the surface parameters comprise at least one selected from the group consisting of: revolutions per minute of the drill string, weight on bit, drilling fluid flow rate, drilling fluid weight, and any combination thereof; Element 5: wherein the formation properties comprise at least one selected from the group consisting of: mineralogy, Young's modulus, brittleness, porosity, permeability, relative permeability, total organic content, water content, Poisson's ratio, pore pressure, and any combination thereof; Element 6: wherein the survey data comprise at least one selected from the group consisting of: inclination, azimuth, measured depth, and any combination thereof. By way of nonlimiting example, the following combinations may be applied to Embodiments A, B, and C: Element 1 in combination with Element 2; two or more of Elements 3-6 in combination; Element 1 in combination with one or more of Elements 3-6 in combination; Element 2 in combination with one or more of Elements 3-6 in combination; and Elements 1 and 2 in combination with one or more of Elements 3-6 in combination.

Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the embodiments of the present disclosure. At the very least, and not as an attempt to limit the application of the doctrine of equivalents to the scope of the claim, each numerical parameter should at least be construed in light of the number of reported significant digits and by applying ordinary rounding techniques.

One or more illustrative embodiments incorporating the embodiments disclosed herein are presented herein. Not all features of a physical implementation are described or shown in this application for the sake of clarity. It is understood that in the development of a physical embodiment incorporating the embodiments of the present disclosure, numerous implementation-specific decisions must be made to achieve the developer's goals, such as compliance with system-related, business-related, government-related and other constraints, which vary by implementation and from time to time. While a developer's efforts might be time-consuming, such efforts would be, nevertheless, a routine undertaking for those of ordinary skill in the art and having benefit of this disclosure.

While compositions and methods are described herein in terms of "comprising" various components or steps, the compositions and methods can also "consist essentially of" or "consist of" the various components and steps.

To facilitate a better understanding of the embodiments of the present disclosure, the following examples of preferred or representative embodiments are given. In no way should the following examples be read to limit, or to define, the scope of the present disclosure.

EXAMPLES

Figure 4:
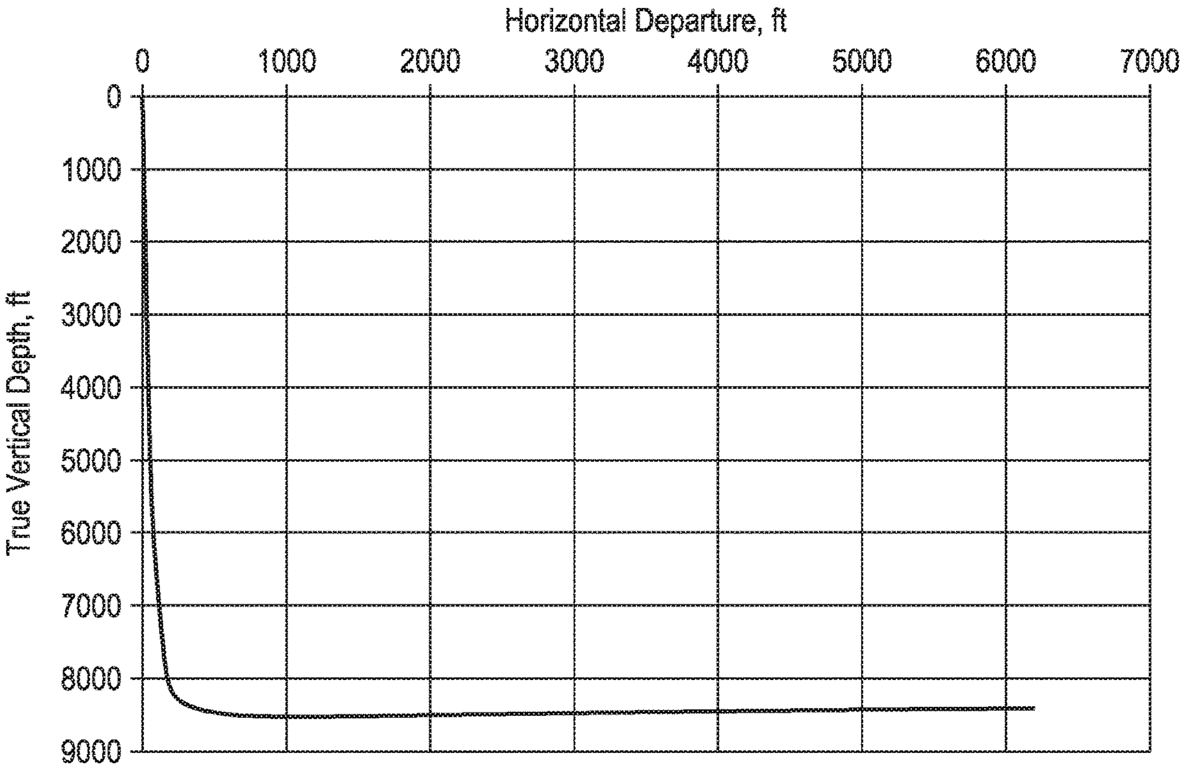
FIG. 4 illustrates a wellbore trajectory for a deviated wellbore used in the examples.

FIG. 4 illustrates an initial wellbore trajectory for a deviated wellbore where the wellhead is at 0 ft horizontal departure and 0 ft true vertical depth.

Figure 5:
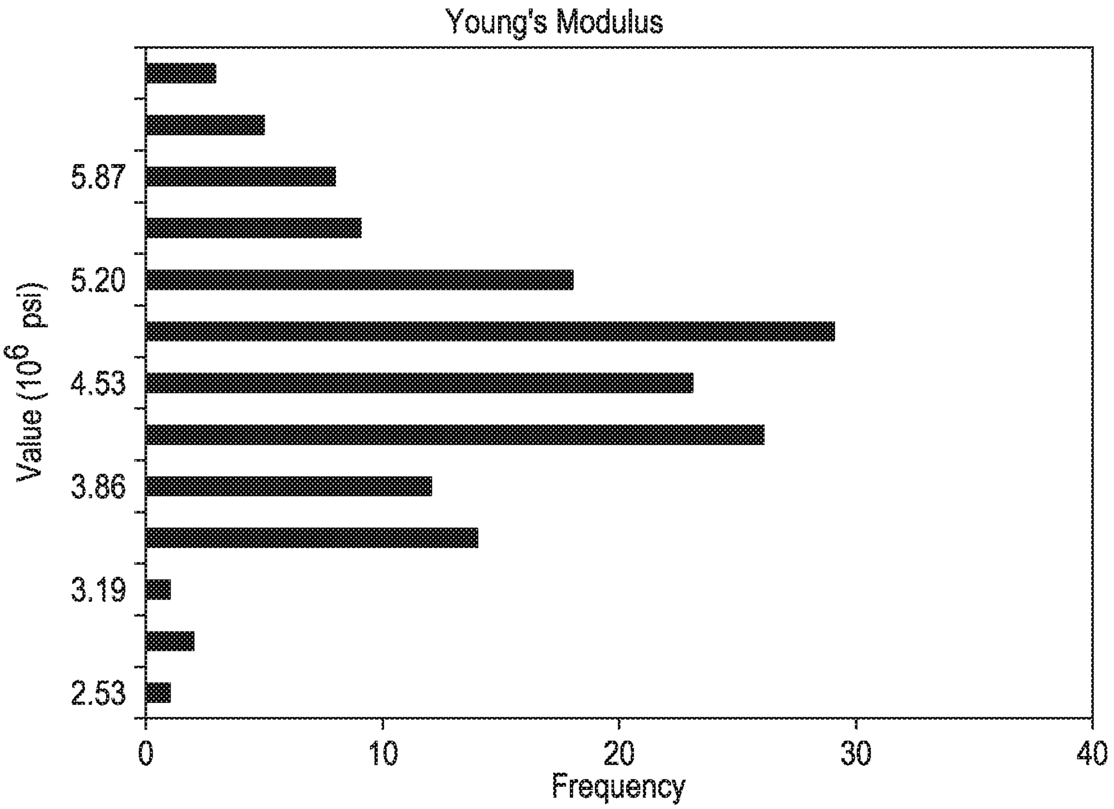
FIG. 5 is a histogram of the values for the Young's modulus along the initial wellbore trajectory in the example.
Figure 6:
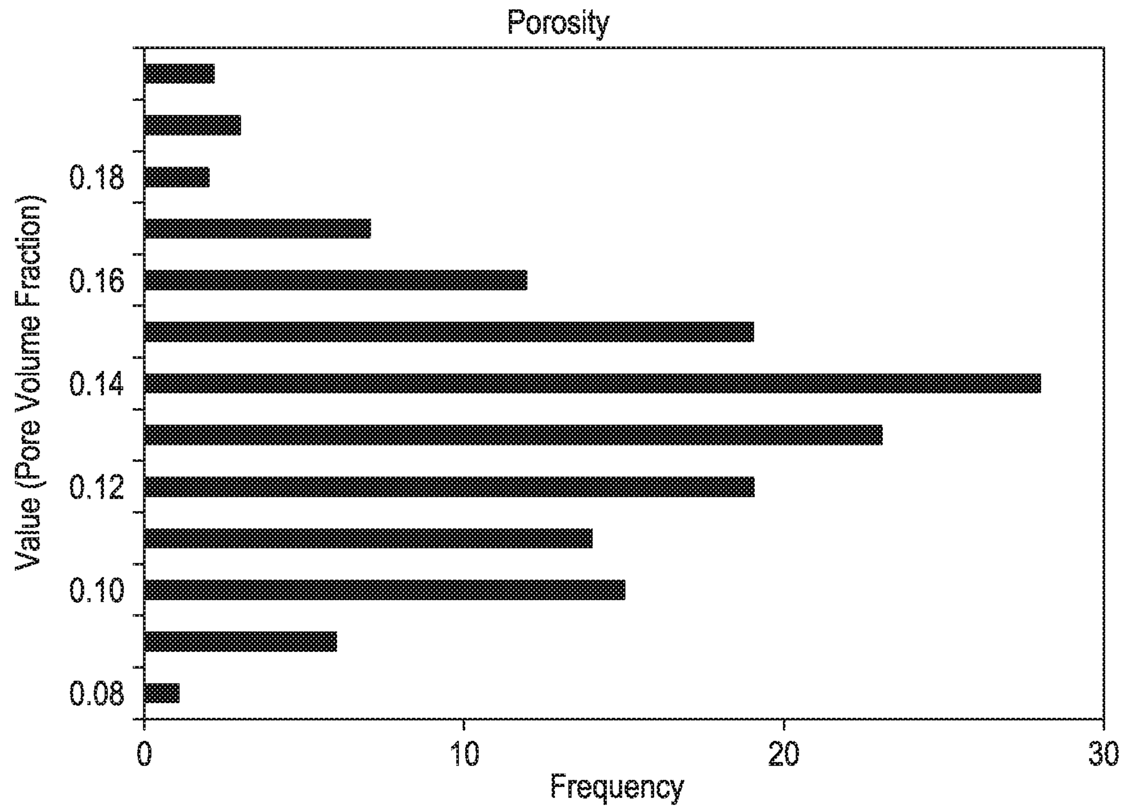
FIG. 6 is a histogram of the values for the porosity along the initial wellbore trajectory in the example.
Figure 7:
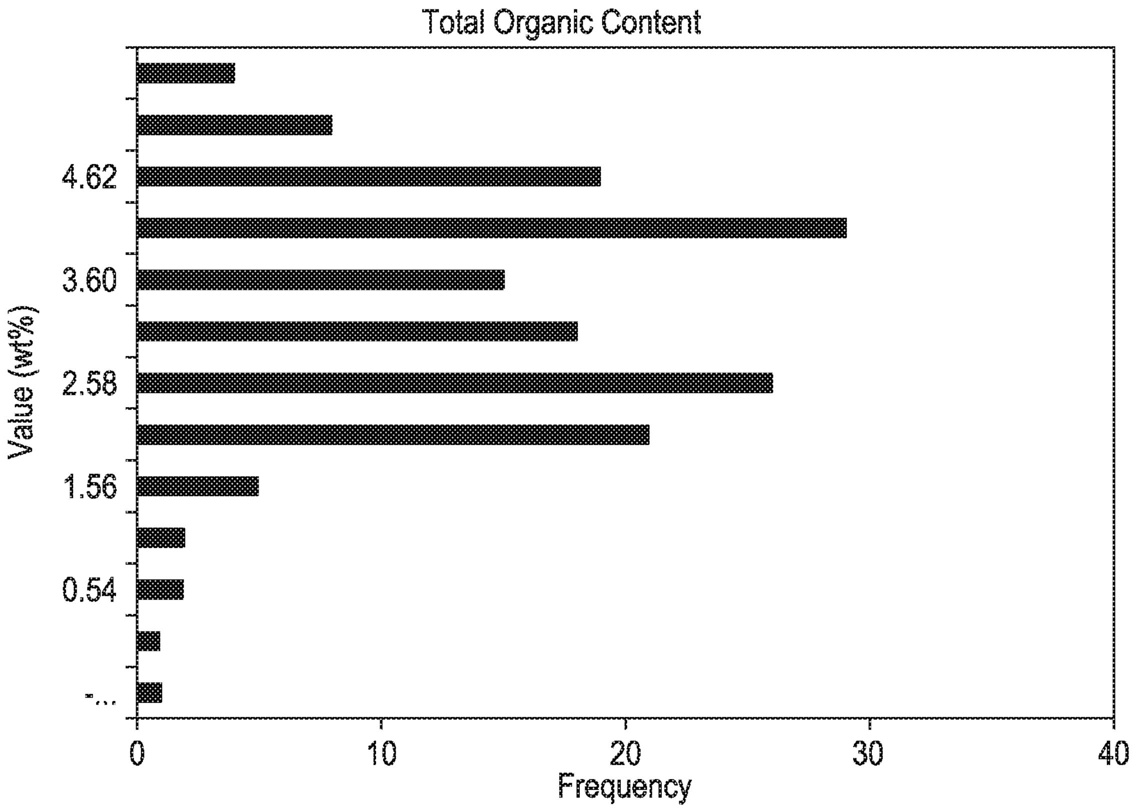
FIG. 7 is a histogram of the values for the total organic content along the initial wellbore trajectory in the example.

Based on formation data collected from various wellbore logs, an earth model was used to calculate the formation properties, specifically, Young's modulus, porosity, and total organic content, along the initial wellbore trajectory. The data sets for each of the formation properties can be described approximately as three normal distributions N (μ, σ) as shown in Table 1. Alternatively or in addition to the normal distributions, the histograms of the values for the formation properties along the initial wellbore trajectory are illustrated in FIGS. 5-7.

TABLE 1

| | Statistics Summary | |
|---|---|---|
| Formation Property | Mean | Standard Deviation |
| Young's Modulus ($10^6$ psi) | 4.49746 | 0.756482 |
| Porosity (pore-volume fraction) | 0.128446 | 0.026418 |
| Total organic carbon (weight %) | 3.055555 | 1.177536 |

Using the earth model and petrophysical proxies, the sweet spots were determined to be at locations along the wellbore trajectory having a Young' modulus >5 Pa, total organic content >4 ppm, and porosity >0.12 pore-volume fraction.

The probability of success for intersecting sweet spots was calculated for the locations around the initial wellbore trajectory. An ideal well path (e.g., ideal well path 238 of FIG. 2) is established by those locations with highest probabilities of success. However, this ideal well path was not necessarily the best target well path to drill. Further adjustment were made to produce a target well path (e.g., target well path 240 of FIG. 2) to account for drillability factors as described herein.

Figure 8:
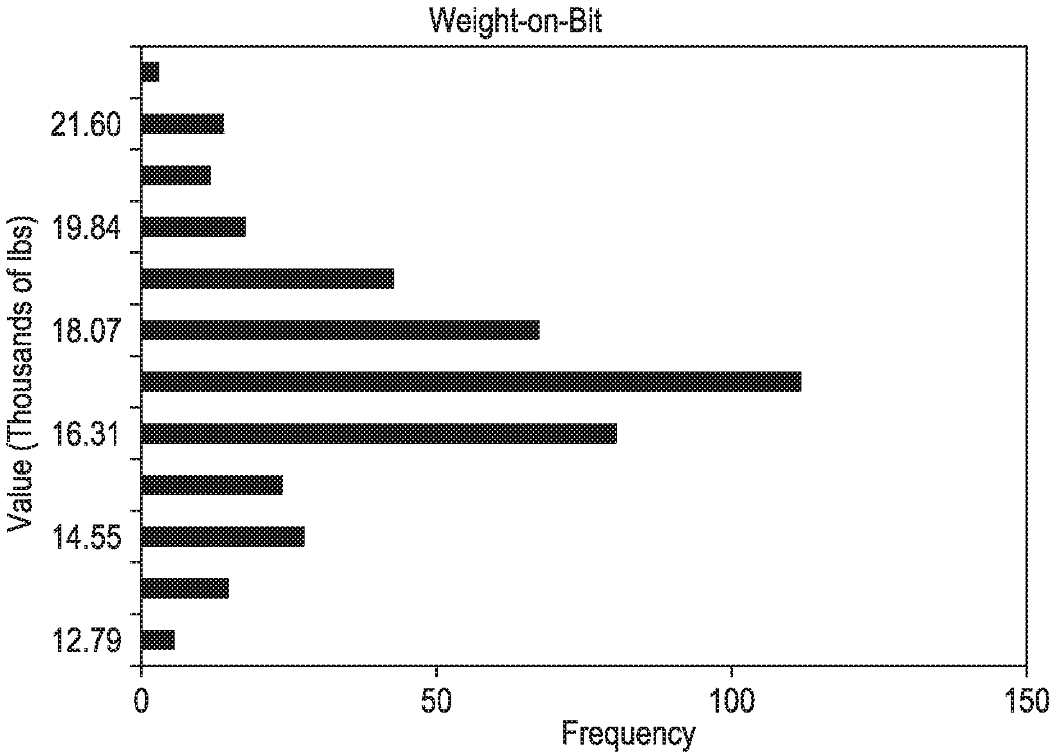
FIG. 8 is a histogram of the values for the weight-on-bit along the initial wellbore trajectory in the example.
Figure 9:
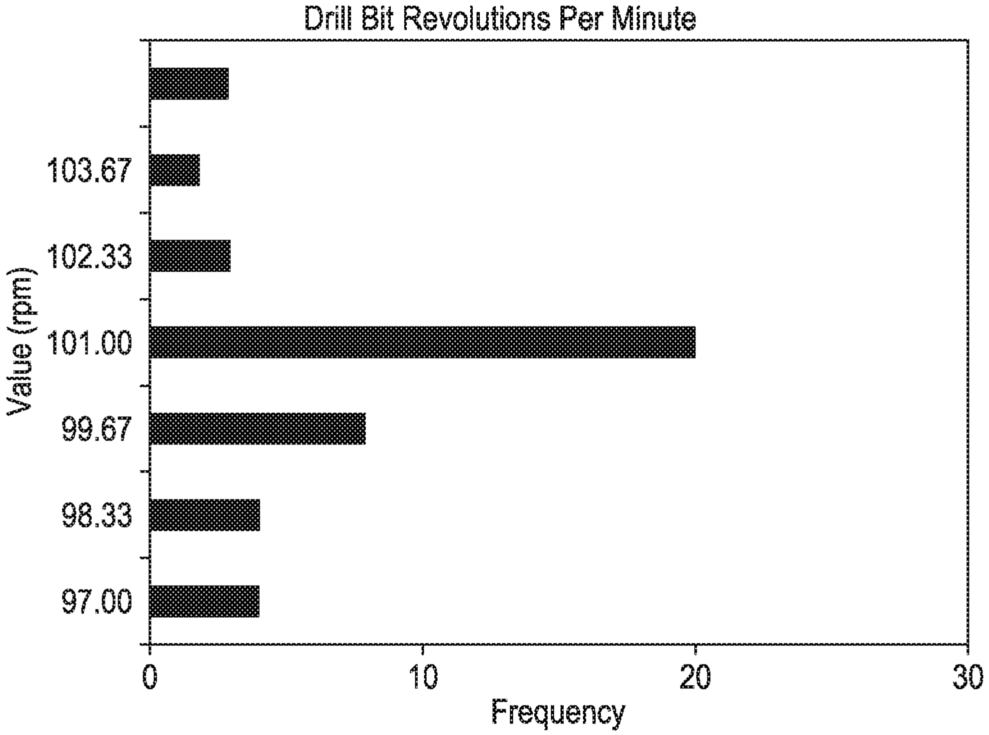
FIG. 9 is a histogram of the values for the drill bit revolutions per minute along the initial wellbore trajectory in the example.
Figure 10:
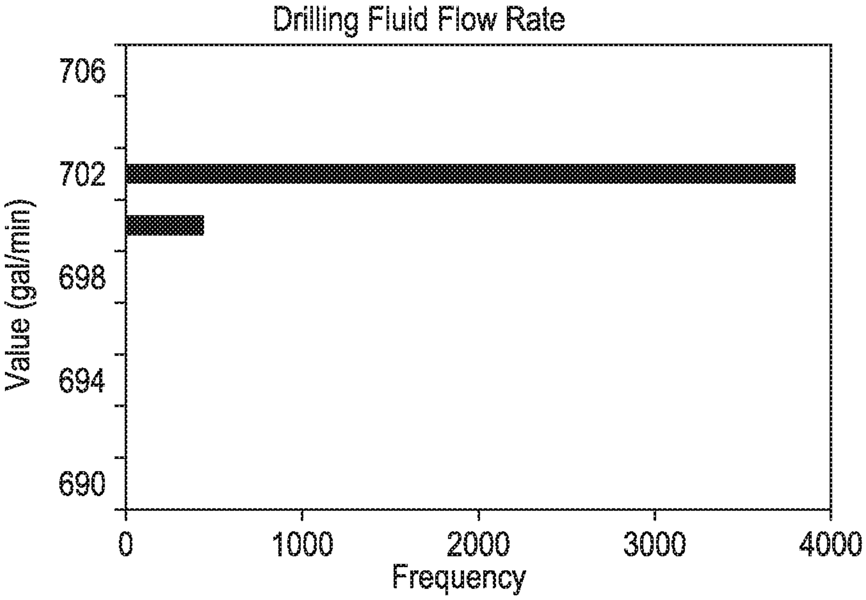
FIG. 10 is a histogram of the values for the drilling fluid flow rate along the initial wellbore trajectory in the example.

The wellbore trajectory ahead of the latest survey location was then simulated with an attempt to achieve the target well path. The actual well path (e.g., actual well path 252 of FIG. 2) is related to both surface parameters and formation properties. As mentioned above, formation properties exhibit uncertainties. In reality, the surface parameters like weight-on-bit, drill bit revolutions per minute, drilling fluid flow rate, and the like also exhibit uncertainties. The data sets for each of the surface parameters can be described approximately as three normal distributions N (μ, σ) as shown in Table 2. Alternatively or in addition to the normal distributions, the histograms of the values for the surface parameters along the initial wellbore trajectory are illustrated in FIGS. 8-10.

TABLE 2

| | Statistics Summary | |
|---|---|---|
| Surface Parameter | Mean | Standard deviation |
| Weight-on-Bit (thousands of lbs) | 17.0321 | 2.2403 |
| Revolutions per Minute | 100.25 | 2.0885 |
| Drilling Fluid Flow Rate (gallons per minute) | 701.05 | 1.1115 |

Figure 11:
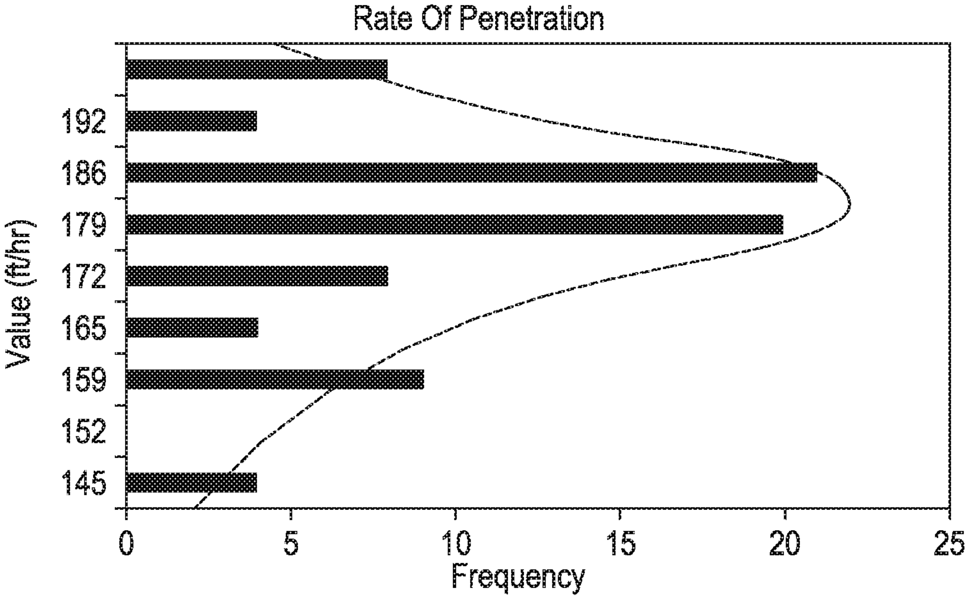
FIG. 11 is a histogram of the values for the drill bit rate of penetration along an interval of the wellbore in the example.

Due, at least in part, to the uncertainties of surface parameters and formation properties, the recorded rate of penetration for the interval of 8000-8030 ft varied with a mean of 174.078 ft/hr and standard deviation of 13.63 ft/hr. The histogram of the rate of penetration for this drilling interval is illustrated in FIG. 11. Therefore, uncertainty in the surface parameters and formation properties cause fluctuation sin the rate of penetration, which ultimately will cause uncertainty of actual well path.

Figure 12:
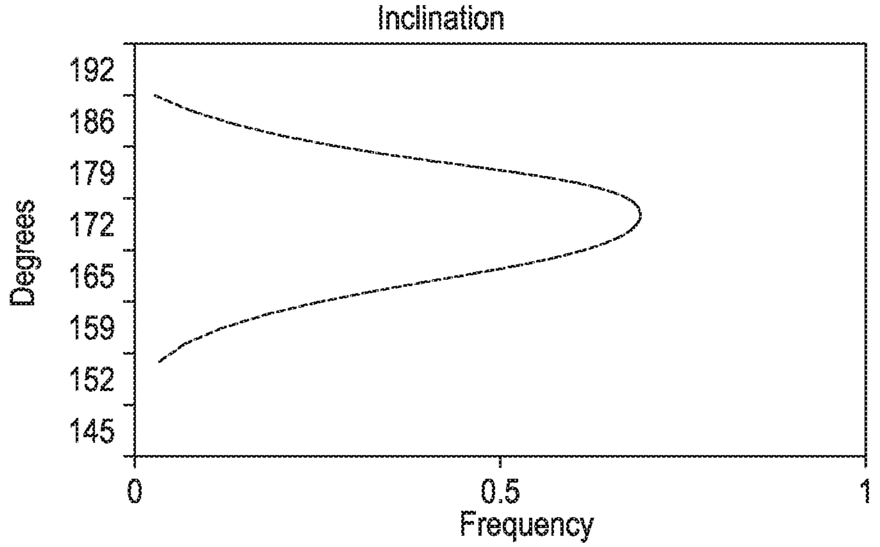
FIGS. 12-13 illustrates the distributions of predicted inclination and azimuth, respectively, at one location ahead of drill bit in the example.
Figure 13:
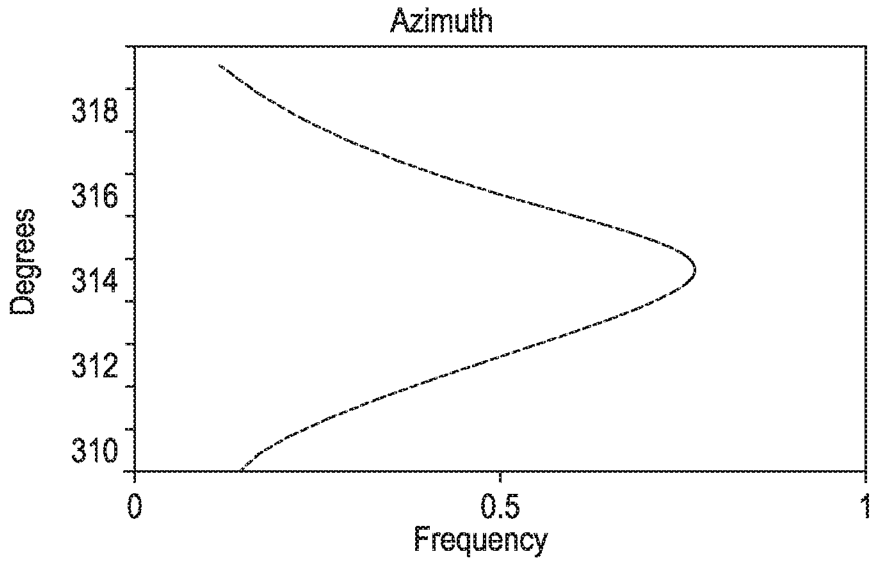

Assuming the bottom hole assembly tool responds very accurately without error, statistical methods (e.g., Monte Carlo, Hypercube, and FORM (First Order Reliability Method)) may be used to compute the actual well path with quantified uncertainties, as shown in Table 3. All position-related data can be described as normal distributions N (μ, σ) where the mean value and standard deviation are computed in real-time. FIGS. 12-13 shows the distributions of predicted inclination and azimuth at one location ahead of drill bit.

TABLE 3

| Meas. | Inclination (°) | | Azimuth (°) | | Dogleg | | |
|---|---|---|---|---|---|---|---|
| Depth (ft) | Mean | Std. dev. | Mean | Std. dev. | Prob. of Overlap | Severity (°/100 ft) | Data Source |
| n | 91.8 | 0.05 | 316.4 | 0.250 | 1.00 | 1.2 | Survey |
| n + 30 | 91.9 | 0.8332 | 316.8 | 2.2087 | 0.98 | 1.0 | Predict |
| n + 60 | 92.1 | 0.8636 | 315.6 | 2.1090 | 0.97 | 0.8 | Predict |
| n + 90 | 90.0 | 0.9445 | 314.7 | 2.6586 | 0.96 | 0.6 | Predict |
| n + 96 | 91.6 | 0.9565 | 315.9 | 2.6987 | 0.96 | 0.6 | Predict |

A single probability of overlapping between actual well path and target well path was also computed, as shown in Table 3. Appropriate acceptance criteria can be pre-determined based on experience. For example, probability of overlapping >0.90 and predicted dogleg severity <3.0°/100 ft may be used for achieving smooth well path with maximum access to sweet spots. If either requirement is not met, the computer program may search for combinations of weight-on-bit, drill bit revolutions per minute, and drilling fluid flow rate, as well as bottom hole assembly orientation adjustments, to change of well path until the criteria are met.

The adjustments of the surface parameters and formation properties may be weighted. For example, wt=60% of adjustment goes to bottom hole assembly orientation, (1-wt)=40% adjustment goes to surface parameters. The value of wt may be pre-optimized using historical data.

Through a close-loop feedback process (e.g., illustrated in FIG. 2), the actual well path can be controlled in a proactive manner. For example, the probability density distributions of each input and output variables change, which allows them to be compared against each other depending on the outcome. For example, the weight-on-bit and drilling fluid flow rate probability density distributions for effecting rate of penetration are illustrated in the upper plot of FIG. 14.

Figure 14:
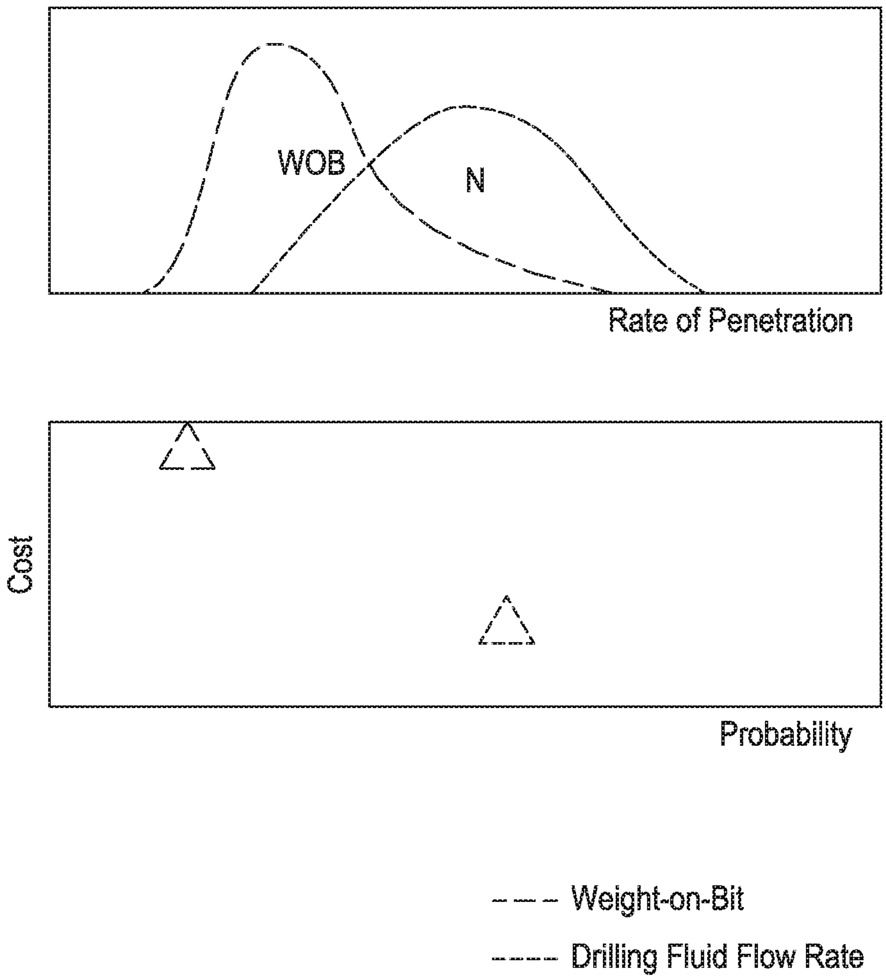
FIG. 14 (top) illustrates the weight-on-bit and drilling fluid flow rate probability density distributions for effecting rate of penetration in the example and (bottom) illustrates the weight-on-bit and drilling fluid flow rate probability relative to cost in the example.

Tradeoffs involving cost and probability of the desired operating variables may also be considered. For example, the weight-on-bit and drilling fluid flow rate probability from the upper plot of FIG. 14 are replotted relative to the cost to change the surface parameter in the bottom plot of FIG. 14.

Expanding on this example, additional surface parameters and their probability levels at a plurality of difference scenarios may be estimated and threshold values for each surface parameter may be set for maximizing the rate of penetration.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present disclosure. The embodiments illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces.

What is claimed is:

1. A method comprising:

drilling a deviated wellbore penetrating a subterranean formation according to bottom hole assembly parameters and surface parameters;

collecting real-time formation data during drilling;

updating a model of the subterranean formation based on the real-time formation data and deriving formation properties therefrom;

collecting survey data corresponding to a location of a drill bit in the subterranean formation;

deriving a target well path for the drilling based on the model of the subterranean formation;

deriving a series of trajectory well paths based on the formation properties, the survey data, the bottom hole assembly parameters, and the surface parameters and uncertainties associated therewith;

deriving an actual well path based on the series of trajectory ell paths;

determining a probability of overlapping between the actual well path and the target well path;

deriving a deviation between the target well path and the actual well path; and adjusting the combination of bottom hole assembly parameters and the surface parameters such that pre-determined acceptance criteria for the probability are met and to maintain the deviation below a threshold.

2. The method of claim 1, wherein the threshold is 10 feet or less at the drill bit.

3. The method of claim 1, wherein deriving a target well path for the drilling based on the model of the subterranean formation comprises:

deriving an ideal well path for the drilling based on the model of the subterranean formation that maximizes intersection between the ideal well path and sweet spots in the subterranean formation; and adjusting the ideal well path to account for drillability factors, thereby producing the target well path.

4. The method of claim 1, wherein the bottom hole assembly parameters comprise at least one selected from the group consisting of: tool face angle, tilt angle, steering pad displacement, and any combination thereof.

5. The method of claim 1, wherein the surface parameters comprise at least one selected from the group consisting of: revolutions per minute of the drill string, weight on bit, drilling fluid flow rate, drilling fluid weight, and any combination thereof.

6. The method of claim 1, wherein the formation properties comprise at least one selected from the group consisting of: mineralogy, Young's modulus, brittleness, porosity, permeability, relative permeability, total organic content, water content, Poisson's ratio, pore pressure, and any combination thereof.

7. The method of claim 1, wherein the survey data comprise at least one selected from the group consisting of: inclination, azimuth, measured depth, and any combination thereof.

8. A system comprising:

a drill string extending into a deviated wellbore penetrating a subterranean formation and having a bottom hole assembly and a drill bit at a distal end of the drill string;

a plurality of sensors in various locations of the system to detect real-time formation data, survey data corresponding to a location of the drill bit in the subterranean formation, bottom hole assembly parameters, and surface parameters;

a control system having a processor;

a non-transitory computer-readable medium communicably coupled to the plurality of sensor and the bottom hole assembly and encoded with instructions that, when executed with the processor, cause the system to perform a method comprising:

drilling the deviated wellbore according to bottom hole assembly parameters and surface parameters;

updating a model of the subterranean formation based on the real-time formation data and deriving formation properties therefrom;

deriving a target well path for the drilling based on the model of the subterranean formation;

deriving a series of trajectory well paths based on the formation properties, the survey data, the bottom hole assembly parameters, and the surface parameters and uncertainties associated therewith;

deriving an actual well path based on the series of trajectory well paths;

determining a probability of overlapping between the actual well path and the target well path;

deriving a deviation between the target well path and the actual well path; and adjusting the combination of bottom hole assembly parameters and the surface parameters such that predetermined acceptance criteria for the probability are met and to maintain the deviation below a threshold.

9. The system of claim 8, wherein the threshold is 10 feet or less at the drill bit.

10. The system of claim 8, wherein deriving a target well path for the drilling based on the model of the subterranean formation comprises:

deriving an ideal well path for the drilling based on the model of the subterranean formation that maximizes intersection between the ideal well path and sweet spots in the subterranean formation; and adjusting the ideal well to account for drillability factors, thereby producing the target well path.

11. The system of claim 8, wherein the bottom hole assembly parameters comprise at least one selected from the group consisting of: tool face angle, tilt angle, steering pad displacement, and any combination thereof.

12. The system of claim 8, wherein the surface parameters comprise at least one selected from the group consisting of: revolutions per minute of the drill string, weight on bit, drilling fluid flow rate; drilling fluid weight, and any combination thereof.

13. The system of claim 8, wherein the formation properties comprise at least one selected from the group consisting of: mineralogy, Young's modulus, brittleness, porosity, permeability, relative permeability, total organic content, water content, Poisson's ratio, pore pressure, and any combination thereof.

14. The system of claim 8, wherein the survey data comprise at least one selected from the group consisting of: inclination, azimuth, measured depth, and any combination thereof.

15. A non-transitory computer-readable medium encoded with instructions that, when executed, cause a system to perform a method comprising:

drilling a deviated wellbore penetrating a subterranean formation according to bottom hole assembly parameters and surface parameters;

collecting real-time formation data during drilling;

updating a model of the subterranean formation based on the real-time formation data and deriving formation properties therefrom;

collecting survey data corresponding to a location of a drill bit in the subterranean formation;

deriving a target well path for the drilling based on the model of the subterranean formation;

deriving a series of trajectory well paths based on the formation properties, the survey data, the bottom hole assembly parameters, and the surface parameters and uncertainties associated therewith;

deriving an actual well path based on the series of trajectory well paths;

determining a probability of overlapping between the actual well path and the target well path;

deriving a deviation between the target well path and the actual well path; and adjusting the combination of bottom hole assembly parameters and the surface parameters such that predetermined acceptance criteria for the probability are met and to maintain the deviation below a threshold.

16. The non-transitory computer-readable medium of claim 15, wherein deriving a target well path for the drilling based on the model of the subterranean formation comprises:

deriving an ideal well path for the drilling based on the model of the subterranean formation that maximizes intersection between the ideal well path and sweet spots in the subterranean formation; and adjusting the ideal well path to account for drillability factors, thereby producing the target well path.

17. The non-transitory computer-readable medium of claim 15, wherein the bottom hole assembly parameters comprise at least one selected from the group consisting of:

tool face angle, tilt angle, steering pad displacement, and any combination thereof.

18. The non-transitory computer-readable medium of claim 15, wherein the surface parameters comprise at least one selected from the group consisting of: revolutions per minute of the drill string, weight on bit, drilling fluid flow rate, drilling fluid weight; and any combination thereof.

19. The non-transitory computer-readable medium of claim 15, wherein the formation properties comprise at least one selected from the group consisting of: mineralogy, Young's modulus, brittleness, porosity, permeability, relative permeability, total organic content, water content, Poisson's ratio, pore pressure, and any combination thereof.

20. The non-transitory computer-readable medium of claim 15, wherein the survey data comprise at least one selected from the group consisting of: inclination, azimuth, measured depth, and any combination thereof.

* * * * *

UNITED STATES PATENT AND TRADEMARK OFFICE

CERTIFICATE OF CORRECTION

PATENT NO. : 10,801,314 B2
APPLICATION NO. : 15/565411
DATED : October 13, 2020
INVENTOR(S) : Robello Samuel et al.

It is certified that error appears in the above-identified patent and that said Letters Patent is hereby corrected as shown below:

In the Claims

Column 10 Line 46, change “ell” to -- well --

Column 11 Line 64, add “path” after -- well --

Signed and Sealed this
Twenty-third Day of February, 2021

Drew Hirshfeld
*Performing the Functions and Duties of the*
*Under Secretary of Commerce for Intellectual Property and*
*Director of the United States Patent and Trademark Office*